United States Patent [19]

Sakaguchi et al.

[11] Patent Number: 4,897,733
[45] Date of Patent: Jan. 30, 1990

[54] COMMUNICATION SYSTEM IN FACSIMILE

[75] Inventors: Yasunori Sakaguchi, Nara; Makoto Yamamoto, Shiga, both of Japan

[73] Assignee: Murata Kakai Kabushiki Kaisha, Kyoto, Japan

[21] Appl. No.: 203,492

[22] Filed: Jun. 7, 1988

[30] Foreign Application Priority Data

Jun. 12, 1987 [JP] Japan .................................. 62-146292
Jun. 12, 1987 [JP] Japan .................................. 62-146293

[51] Int. Cl.⁴ ............................................ H04N 1/415
[52] U.S. Cl. .................................... 358/433; 358/435; 371/31
[58] Field of Search ............... 358/280, 294, 433, 432, 358/138, 135, 136, 435; 371/31

[56] References Cited

U.S. PATENT DOCUMENTS 4,623,936 11/1986 Urban et al. .......................... 358/284

Primary Examiner—Edward L. Coles, Sr.
Attorney, Agent, or Firm—Spensley Horn Jubas & Lubitz

[57] ABSTRACT

On the transmitting side, a writing is divided in blocks, read picture signals for one block are stored in a picture signal memory, the stored picture signals are interleaved in the order of the specific pattern, and then the interleaved signals are transmitted, and on the receiving side, the above-mentioned received picture signals for one block are stored in a picture signal memory, and the picture signals are deinterleaved in the order of read of the writing.

16 Claims, 7 Drawing Sheets

COMMUNICATION SYSTEM IN FACSIMILE

FIELD OF THE INVENTION

The present invention relates to a communication system in a facsimile, and particularly to processing for communication errors.

RELATED ART STATEMENT

Until now, facsimile communication has performed transmission and reception of information through an ordinary telephone circuit. For example, when a writing of A4 size is transmitted, the number of picture elements in one line has been decided to be 1728 dots in accordance with the recommendation of CCITT (Consulting Committee for International Telephone and Telegraph). But, when conditions of a telephone circuit are bad, errors occur in transmitting data, and consequently, sometimes data of a number of bits different from 1728 reach a receiver. When such transmission errors have occurred, various processing methods as described below are adopted.

(1) The receiver neglects such errors and prints them as they are.

(2) In the case of a full duplex communication system, as soon as the receiver finds errors, it informs the transmitter of occurrence of the errors, and, at the same time, of the places where the errors occur. The transmitter performs transmission once more from the places where the errors occur.

(3) In some half duplex communication systems, when the receiver finds errors, the line containing the errors is regarded and printed as identical with the just preceding line.

Recently, the so-called mobile communication services like a land mobile telephone service or a radio signaling service have been utilized together with the development of communication systems. Among such mobile communication services, there are available some services in which messages are sent through an ordinary telephone circuit via the transmitting side, namely, a base station to the receiving side, namely, a mobile station (For example, a moving body such as an automobile), another services in which messages are inversely sent from a mobile station to a base station, further another service in which two way messages are sent between two mobile stations and so on.

(Problems which the Invention Intends to Solve)

Figure 10A:
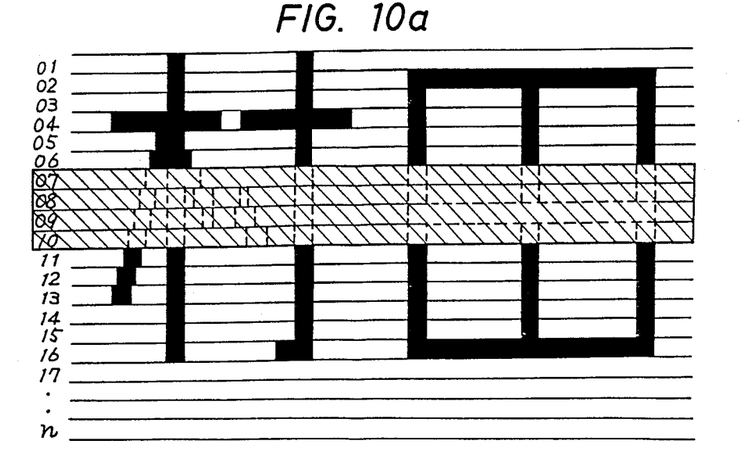
FIG. 10a is an example of picture information showing occurrence of errors by conventional transmission and reception.

In a facsimile communication system utilizing the above-mentioned mobile communication services, a mobile propagation path between a mobile station and a base station is composed of multiple ray propagation paths, because it is subjected to reflection, diffraction, scattering, and the like by configurations of the ground and buildings around the mobile station. Accordingly, as the mobile station (a moving body) travels, the probability that transmission errors will occur due to electric wave troubles due to the so-called fading phenomena in which a receiving level is complicatedly varied every moment and the like is high. When a received picture including, for example, characters of " 村田 " are received as shown in FIG. 10a, it is feared that transmission errors occur, extending especially over a plurality of successive lines "07"·"08"·"09"·"10" among picture signal lines "01" through "n".

But, in such a case, the above-mentioned processing method 1 causes an effect that picture information in a plurality of erroneous lines is printed as it is.

As a full duplex system is used in the above-mentioned processing method 2, the equipments are made expensive, and a very long time is needed to print picture information because the probability that transmission errors will occur is high.

Figure 10B:
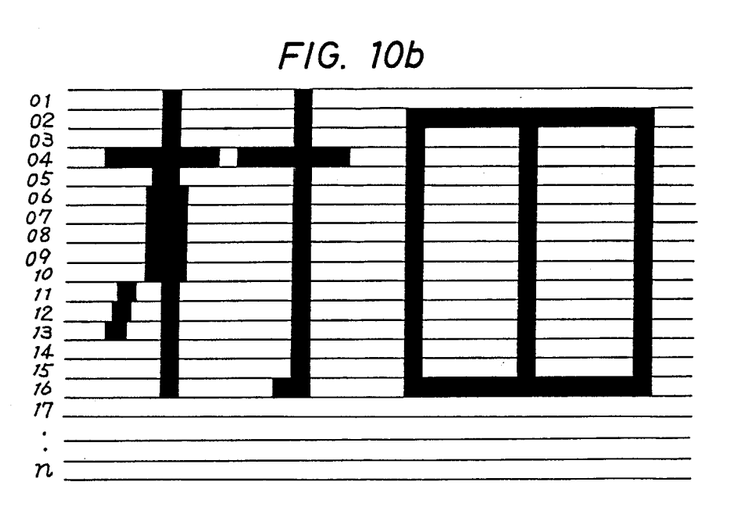
FIG. 10b is a received and modified picture obtained by a conventional processing method for errors.

In the above-mentioned processing method 3, the picture information "06" identical with the just preceding line is printed ranging over a plurality of successive lines "07" through "10" as shown in FIG. 10b in a received and modified picture. Finally, five picture signal lines from "06" line to "10" line are printed as the same picture information. Accordingly, it is difficult to read the picture information or it is impossible to decipher it, depending upon characters.

OBJECT AND SUMMARY OF THE INVENTION

It is an object of the present invention to eliminate the above-mentioned defects, and to provide a communication system in a facsimile capable of coping with transmission errors in picture information using a simple and reliable method although a half duplex communication system is used.

In order to accomplish the above-mentioned object, the present invention is devised in such a manner that on the transmitting side, a writing is divided in blocks, read picture signals for one block are stored in a picture signal memory, the stored picture signals are interleaved in the order of the specific pattern, and then the interleaved signals are transmitted, and on the receiving side, the above-mentioned received picture signals for one block are stored in a picture signal memory, and the picture signals are deinterleaved in the order of read of the writing.

BRIEF DESCRIPTION OF DRAWINGS

FIG. 7a through FIG. 7d are examples of first examples of processing for transmission errors;

DETAILED DESCRIPTION OF PREFERRED EMBODIMENTS

An embodiment according to the present invention will be described in reference with attached drawings.

Figure 2:
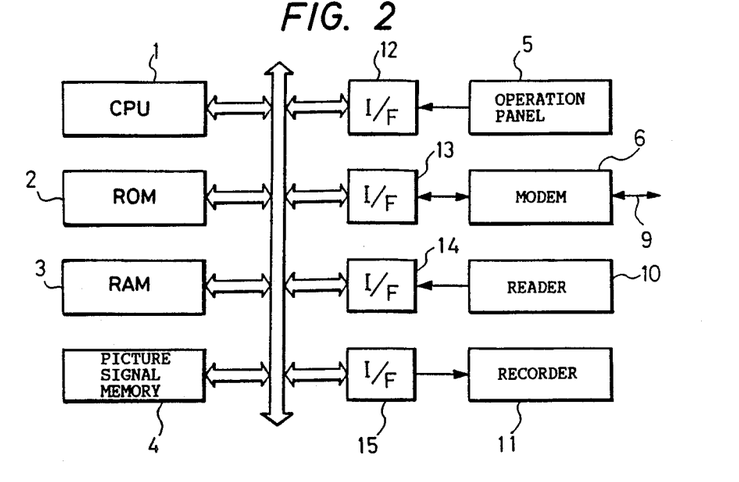
FIG. 2 is a block diagram of a facsimile for putting a present invention into practice.

FIG. 2 shows a suitable embodiment of a facsimile device for bringing a communication system in a facsimile according to the present invention into operation.

Numerals 1, 2, 3 and 4 are a CPU, a ROM which has stored an operation program of the present facsimile, a RAM which stores various kinds of data arising together with progress of the program, and a picture signal memory composed of RAMs, respectively. Numerals 5, 6, 9, 10 and 11 are a operation panel for various kinds of input operations such as a transmission command and the like, a modem, a circuit, a reader in which picture data in a writing are scanned to convert the scanned data into a binary electrical signal showing read white or black and output it, and a recorder for printing out received picture data on a recording paper, respectively. Numerals 12, 13, 14 and 15 are interfaces respectively.

Figure 5A:
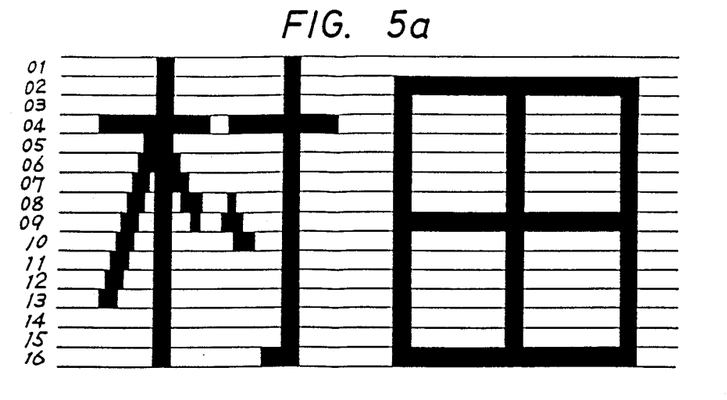
FIG. 5a is a diagram showing an example of picture information for one block.
Figure 5B:
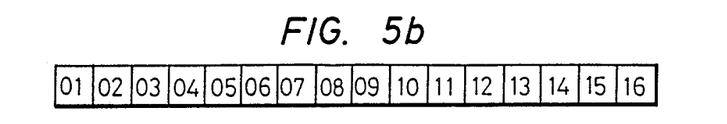
FIG. 5b is a diagram indicating the order of picture signals read in a reader.
Figure 5C:
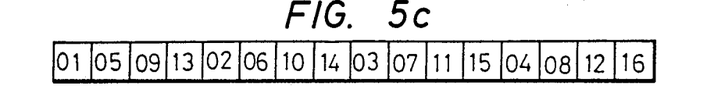
FIG. 5c is a diagram indicating the order of picture signals when the picture signals in FIG. 5b are interleaved.

In the present embodiment, on the transmitting side, the number of picture signals stored in the picture signal memory 4 is read in the reader 10 with 16 lines handled as one block. The picture signals are stored in the order of the read as shown in FIG. 5b (For example, it is assumed that information is characters of " 村田 " as shown in FIG. 5a). After that, picture signals "01" through the "16" for one block are interleaved (rearranged) by a command from the CPU 1 in the order of the specific pattern, and the interleaved picture signals "01" through "16" are fetched from the picture signal memory 4 for transmission.

On the receiving side, after received picture signals "01" through "16" FIG. 5c are stored in the picture signal memory 4 with 16 lines handled as one block in the same way as mentioned previously, they are interleaved by a command from the CPU 1 and restored to the picture signals "01" through "16" in the former order which was read by the reader "10" as shown in FIG. 5b.

Figures 3, 4, 11:
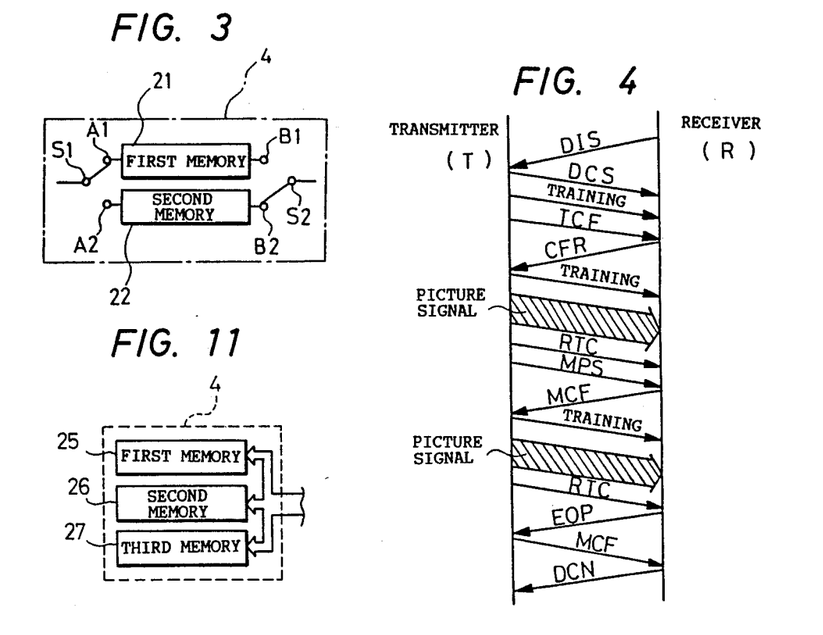
FIG. 3 is a detailed diagram showing an example of a constitution of the picture signal memory 4 in FIG. 2.
FIG. 4 is a diagram for roughly explaining communication procedures between a transmitter and a receiver of a facsimile.
FIG. 11 is a detailed diagram showing a second example of the configuration of the picture signal memory 4 in FIG. 2.

An example of the configuration of the picture signal memory 4 comprises two memories, that is, a first memory 21 and a second memory 22 as shown in FIG. 3. It is necessary for the respective memories 21 and 22 to have at least capacity for one block 16 lines. The above-mentioned memories 21 and 22 are provided with input terminals A1 and A2 and output terminals B1 and B2 respectively, and on the transmitting side, there are provided a switch S1 which transfers signals from the reader 10 to the above-mentioned memory 21 or 22 and a switch S2 which transfers signals from the memory 21 or 22 to a modem 6 in such a manner that both switches are alternately operated. Also, on the receiving side, there are provided a switch S1 which transfers received signals from the modem 6 to the above-mentioned memory 21 or 22 and a switch S2 which transfers signals from the memory 21 or 22 to a recorder 11 in such a manner that both switches are alternately operated.

Now, when a writing of, for example, A4 size is transmitted, there are 1144 lines in the subscanning direction. If these lines are each divided into one block 16 lines, 71 blocks are obtained and fractions of 8 lines are left. As to the picture signals for the insufficient 8 lines, it is feared that the picture signals stored in the memory at the preceding time are read out. Accordingly, in the present embodiment, when the picture signals which have been stored in the memories 21 and 22 do not amount to those for 16 lines, the insufficient lines are all stored as white signals.

Figure 6:
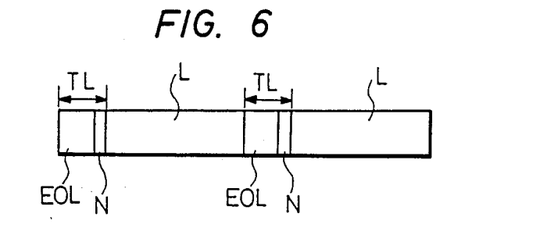
FIG. 6 is a rough format of picture information signals used in a method according to the present invention.

FIG. 6 shows a rough format of a picture information signal which is used in the embodiment according to the present invention. The picture information signal is a series-type signal which comprises both a picture information signal L and a phase signal TL for one line, the both signals being alternately repeated. An end of line signal EOL, a line number indicating signal N, and the like are inserted into the phase signal TL. Here, the insertion position of the line number indicating signal N is an example in the present embodiment.

FIG. 4 roughly shows a duplex communication between a transmitter T and a receiver R based on the G3 mode of CCITT.

Before duplex communication of picture signals, a function identificating signal DIS and a reception command DCS are sent from a receiver R and a transmitter T, respectively. Furthermore, after a training signal and a circuit checking signal TCF are sent from the transmitter T and a reception preparation confirming signal CFR is sent from the receiver R, picture signals for the first sheet of a writing are transmitted. At the time when the picture signals for the first sheet have been transmitted, a picture signal terminating signal RTC is sent from the transmitter T. After that, when the writing is composed of a plurality of sheets, a multi-page signal MPS is sent from the transmitter L. In response to this, a message confirming signal MCF is sent from the receiver R, and next, duplex communication of picture signals for the second sheet of the writing is carried out. When the transmission of the picture signals has terminated, an end of procedure signal EOP is sent from the receiver R, and a message confirming signal MCF and a circuit disconnecting command DCN are sent from the transmitter T and the receiver R respectively, resulting in termination of all duplex communication.

Figure 1A:
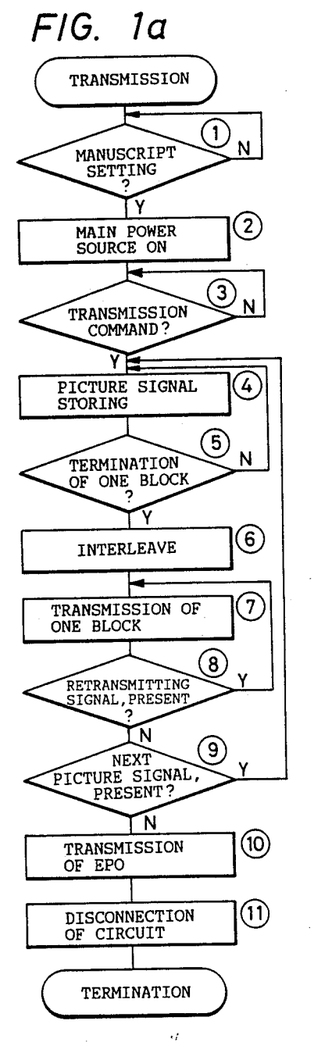
FIG. 1a and FIG. 1b are flow charts of a transmitter and a receiver respectively.
Figure 1B:
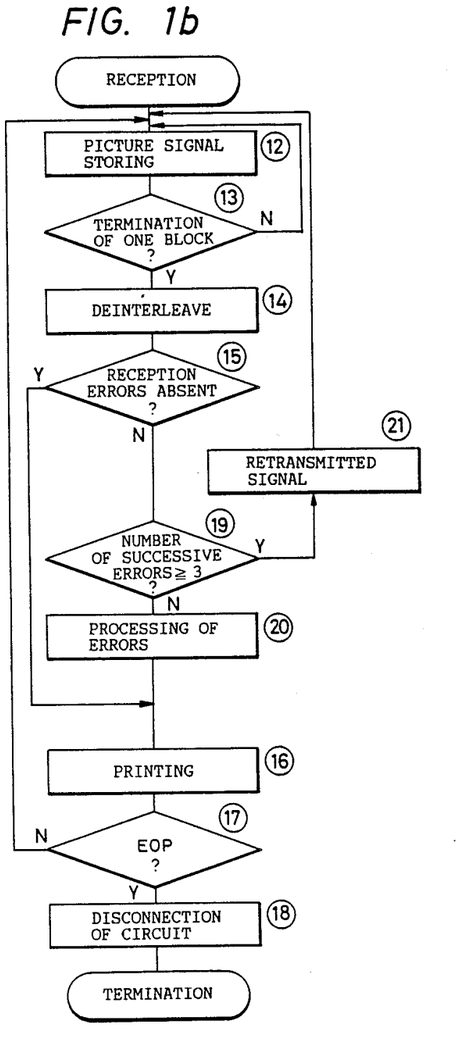

Next, the operation of the mobile communication system using the above-mentioned facsimile device will be described in detail based on FIG. 1a and FIG. 1b shown in the flow chart.

In a facsimile device in the transmitting side, that is, a transmitter, when the CPU 1 detects a writing which has been set in the reader 10 (Step 1), it turns a main power source of the transmitter on (Step 2), waits for an input of a dial number of a remote station from an operation panel 5 and an input of transmission command (Step 3), and then directs the reader 10 to start reading of the writing. After picture signals indicating white or black which are read in the reader 10 are converted from serial signals to parallel signals in the interface 14, they are converted into Run Length codes in the CPU 1 or a well-known counter circuit not shown and stored in the first memory 21 in the picture signal memory 4 via the input terminal A1 from the switch S1 (Step 4).

The picture signals in the first memory 21 with 16 lines handled as one block (Step 5), that is, the picture signals "01" through "16" are stored as shown in FIG. 5b as described previously (For example, it is assumed that information is shown in FIG. 5a). Furthermore, they are interleaved in the order of specific patterns (Step 6) shown in FIG. 5c. Next, the switch S1 and the switch S2 are changed over to the input terminal A2 side and the output terminal B1 side, respectively. The CPU 1 fetches in sequence the interleaved picture signals for one block, "01" through "16" in the first memory 21 and converts them from Run Length codes to MH (Modified Huffman) codes or MR (Modified Read) codes. After the converted picture signals are converted from serial signals to parallel signals in the interface 13, they are modulated in the modem 6 and sent onto the circuit 9 (Step 7). Since, at this time, picture signals for new one block 16 lines are stored in the second memory 22 via the input terminal A2 from the switch S1, the operations of the above-mentioned sending and reading of the writing are simultaneously carried out, resulting in very good efficiency.

Then, after the picture signals in the second memory 22 are interleaved, they are sent as before. When the above procedures are repeated (Step 9), and the picture signals from the reader 10 are terminated, the procedure termination signal EOP is transmitted (Step 10). As a result, the circuit 9 is cut (Step 11), resulting in termination of the transmission operation.

In the facsimile, that is, the receiver on the receiving side, after picture signals which have been sent to the mobile station via the base station by mobile communication are demodulated in the modem 6 and converted from serial signals to parallel signals in the interface, they are temporarily supplied into the RAM 3. At the same time as this, the picture signals in the RAM 3 are sequentially taken in the CPU 1, converted from the MH code or MR code to Run Length code, and stored into the first memory 21 in the memory 4 via the input terminal A1 from the switch S1 (Step 12). With 16 lines of the picture signals in the first memory 21 packed into one block in the same way as before (Step 13). The picture signals "01" through "16" are stored as shown in FIG. 5c, further interleaved in the order of the specific pattern shown in FIG. 5b (Step 14), and returned to the former order which is read in the reader 10 on the transmitting side.

Here, when there is no transmission error as described later (Step 15), the switch S1 and the switch S2 change over to the side of the input terminal A2 and the side of the output terminal B1 respectively, and the CPU 1 take in the interleaved picture signals "01" through "16" for one block in the first memory 21 via the switch S2 from the output terminal B1 in sequence. The picture signals are converted from the Run Length code to picture signals indicating white or black by the above-mentioned counter circuit, further supplied to the recorder 11 via the interface 15, and printed out on a recording paper as shown in FIG. 5a (Step 16). At this time, since new picture signals for one block 16 lines are received and stored into the second memory 22 via the input terminal A2 from the switch S1, the above-mentioned receiving and recording printout operations are simultaneously carried out, resulting in very good efficiency. When the CPU 1 detects the end of procedure signal EOP (Step 17), it sends the message confirming signal MCF and cuts the radio circuit (Step 18).

Next, a processing method for transmission errors when conditions of communications include errors will be described with reference to FIG. 7a through FIG. 9d.

Figure 7A:
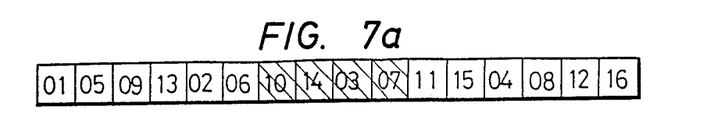
FIG. 7a is a diagram indicating the order of received picture signals for one block.
Figure 7B:
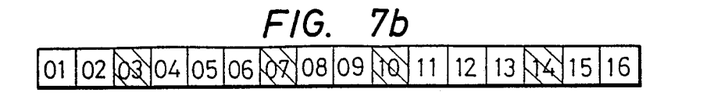
FIG. 7b is a diagram indicating the order of picture signals when the picture signals in FIG. 7a are deinterleaved.
Figure 7C:
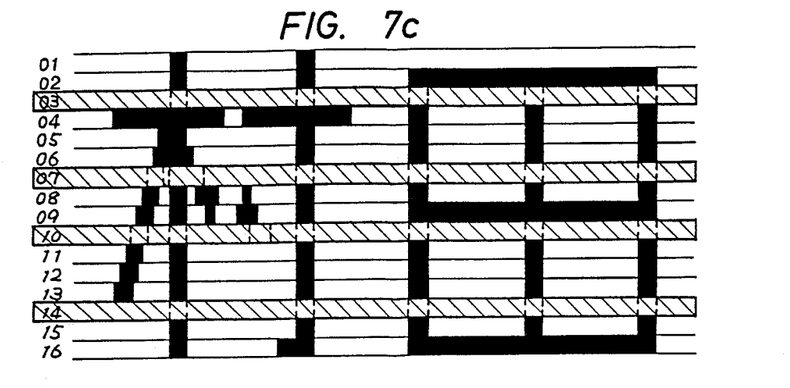
FIG. 7c is a diagram showing an example of picture information in FIG. 7b.
Figure 7D:
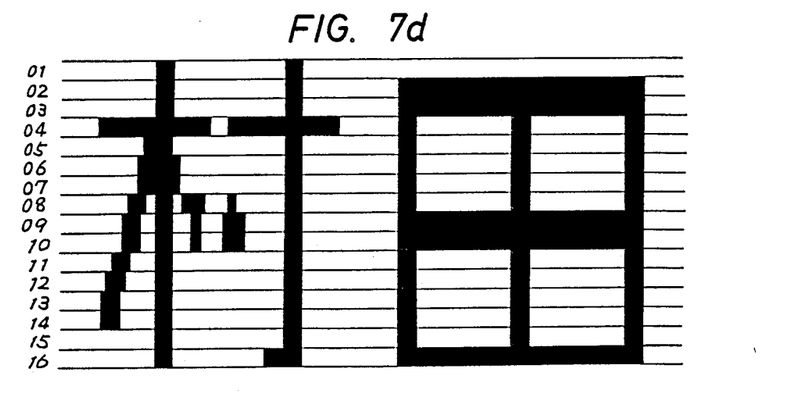
FIG. 7d is a received and modified picture obtained by a processing method for errors.

As described previously, the probability that transmission errors occur due to electric wave troubles such as fading and the like in mobile communications is high, and especially sometimes the troubles occur, extending over a plurality of serial lines. As a first example of processing for transmission errors, even if transmission errors occur, extending over the picture signals for one block stored in the first memory 21 (or the second memory 22) (Step 12), for example, the picture signals of four lines "10"."14"."03"."07" as shown in FIG. 7a on the receiving side, if they are deinterleaved (Step 14), a plurality of lines containing errors are shared as shown in FIG. 7b (For example, information is shown in FIG. 7c). The line containing errors is regarded as identical with the just preceding line, using a half duplex communication system (Step 20), that is, in this case, the picture signals "02", "06", "09", and "13" are regarded as identical with the picture signals "03", "07", "10", and "14" respectively, allowing the picture signals to be printed out as a received and modified picture shown in FIG. 7d (Step 16). In the half duplex communication system in the present embodiment in this time (Step 20), the line containing errors is regarded as identical with the just succeeding line by control of the CPU 1, that is, in this case, the picture signals "04", "08", "11", and "15" are regarded as identical with "03", "07", "10", "14"respectively, allowing the picture signals to be printed out (Step 16).

Figure 8A:
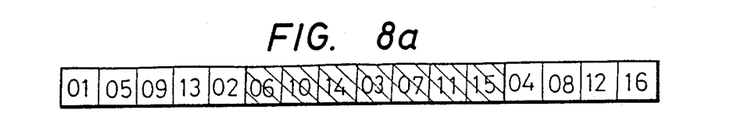
FIG. 8a through FIG. 8d are second examples of processing for the same transmission errors.
Figure 8B:
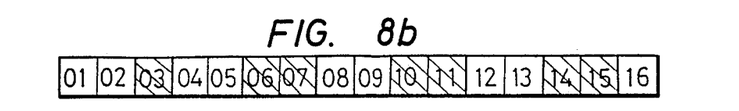
Figure 8C:
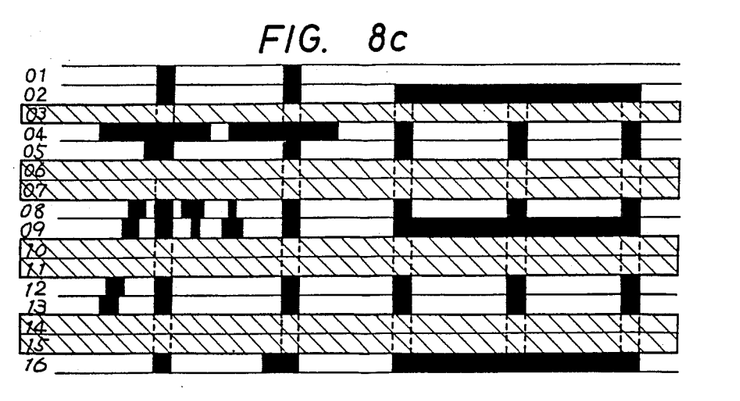
Figure 8D:
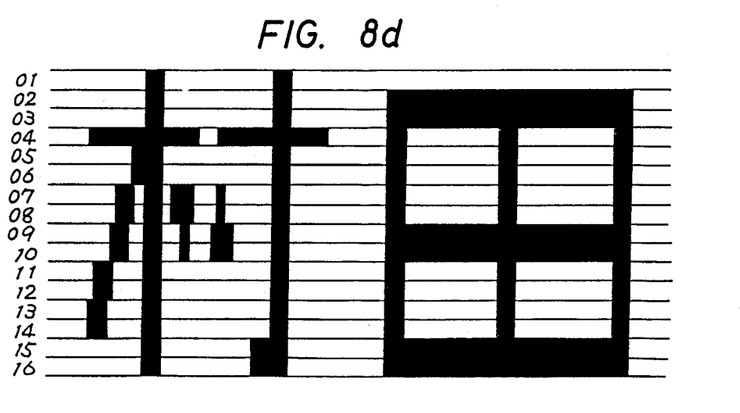

As a second example of processing for transmission errors, even if successive transmission errors occur, extending over the stored picture signals for one block, for example, the picture signals of seven lines "06"."10"."14"."03"."07"."11"."15" as shown in FIG. 8a, if they are deinterleaved (Step 14), a plurality of lines containing errors are shared as shown in FIG. 8b (For example, information is shown in FIG. 8c). The line containing errors is regarded as identical with the just preceding or just succeeding line, using the half duplex communication system (Step 20) based on control of the CPU 1, that is, in this case, the picture signals "02", "05", "08", "09", "12", "13", and "16" are regarded as identical with the picture signals "03", "06", "07", "10", "11", "14" and "15" respectively, allowing the picture signals to be printed out as a received and modified picture shown in FIG. 8d (Step 16). As a result, the picture signals can be sufficiently understood as the character of " 村日 ".

Figure 9A:
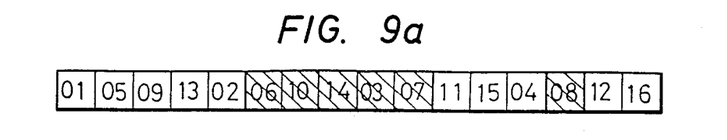
FIG. 9a through FIG. 9d are third examples of processing for the same transmission errors.
Figure 9B:
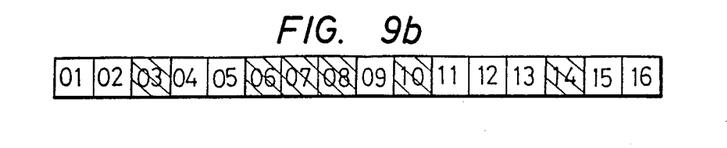
Figure 9C:
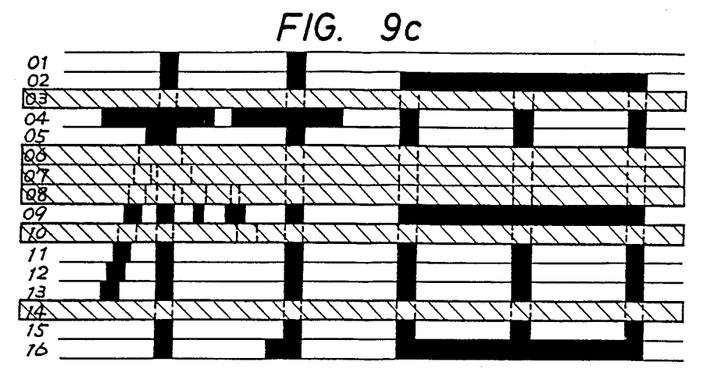
Figure 9D:
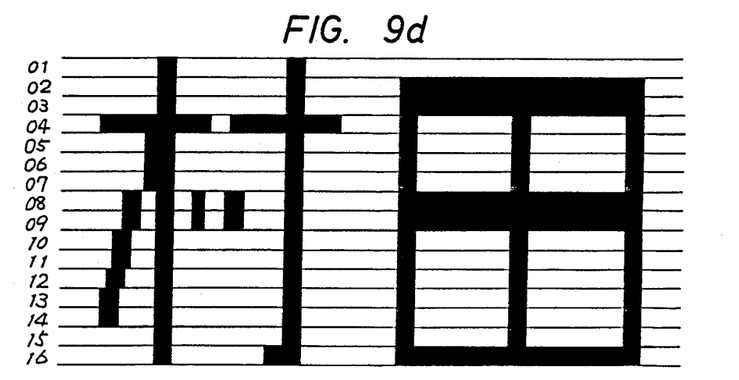

Since 16 lines of picture signals are handled as one block in the present embodiment, this embodiment can not basically cope with picture signals of transmission errors which are over eight lines (over a half of total lines in one block). But, as a third example of processing for transmission errors, when transmission errors occur in the picture signals for one block, for example, the picture signals of six lines "06"."10"."14"."03"."07" and "08" as shown in FIG. 9a, if they are deinterleaved (Step 14), the lines containing errors are shared as shown in FIG. 9b (For example, information is shown in FIG. 9c). But, lines containing errors are present, extending over three lines of the picture signals of "06", "07" and "08". By the half duplex communication system (Step 20), the picture signals of "02", "05", "09", "11", and "13" are equal to the picture signals "03", "06", "08", "10", and "14" respectively. Assuming that the picture signal of "06" is regarded as identical with the picture signal "07" ("06"="05"), when the picture signals are printed out as a received and modified picture (Step 16), the picture signals of "05", "06" and "07" become the identical signal, and some problems are left for fine sentences or minute drawings, depending upon the writing.

Accordingly, in the present embodiment, after the picture signals (Step 12) for one block 16 lines stored in the first memory 21 or second memory 22 on the receiving side are deinterleaved (Step 14), when occurrence of errors on lines over successive three lines is detected in the CPU 1 (Step 19), retransmitting signals of the picture signals for one block are sent from the CPU 1 (Step 21). When the CPU 1 on the transmitting side detects the retransmitting signals (Step 8), the picture signals for one block in the first memory 21 or the second memory 22 are retransmitted. Since the picture signals are retransmitted for each one block as to retransmission, errors are rapidly processed.

The picture signals stored in the first memory 21 and the second memory 22 in the picture signal memory 4 are not always restricted to one block of 16 lines as in the embodiment, but may be composed of blocks of a suitable plural lines. Also, either one of the memories 21 and 22 in the picture signal memory 4 or a memory except the two memories may be provided to cope therewith. The order of the specific pattern by which the picture signals for one block in the picture signal memory 4 are interleaved in the transmitter (Step 6) is not always restricted to the example in the present embodiment, but the order of the specific pattern which is shared when, for example, a plurality of error picture signals in succession are deinterleaved in the receiver (Step 14) is suitable.

For example, as a second example of the configuration of the picture signal memory 4, the picture signal memory 4 is composed of three memories of the first memory 25, the second memory 26, and the third memory 27 as shown in FIG. 11, and devised in such a manner that picture signals for the preceding one block 16 lines are stored in the first memory 25, picture signals for the present one block are stored in the second memory 26, and picture signals for the succeeding block are stored in the memory 27. In other words, the three memories 25, 26, and 27 are provided in the picture signal memory 4, thereby allowing the picture signal "01" in the second memory "26" to be recorded by regarding the picture signal "01" as identical with the picture signal "16" in the first memory 25 or allowing the picture signal "16" in the second memory 26 to be recorded by regarding the picture signal "16" as identical with the picture signal "01" in the third memory 27 as a processing method for transmission errors. When printing of the picture signals in the second memory 26 is terminated in this way, information in the second memory 26 is transferred into the first memory 25, information in the third memory 27 is transferred into the second memory 26, and newly received picture signals are stored in the third memory 27.

The order of the specific pattern by which the picture signals for one block in the picture signal memory 4 are interleaved in the transmitter (Step 6) is not always restricted to the example in the present embodiment, but the order of the specific pattern which is shared when, for example, a plurality of successive error picture signals are deinterleaved in the receiver (Step 14) is suitable.

In the present embodiment, when the picture signals for one block which have been stored in the receiving side are deinterleaved (Step 14), and error picture signals over successive three lines (Step 19) are present (Refer to FIG. 9b and FIG. 9c), the operation of retransmission is due to be carried out (Step 21). But, it may be also carried out in the case besides the above-mentioned circumstance.

In the above present embodiment, mobile communication is presupposed for facsimile transmission. But, the present embodiment is, of course, applicable to transmission and reception of facsimile signals using only conventional ordinary telephone circuits. Furthermore, the bit interleave method, the error correction method and the like which have been well-known are jointly employed, thereby exhibiting the effect of the invention to the full.

As described in detail previously, according to the present invention, after the picture signals are interleaved for each one block in the order of the specific pattern, they are transmitted. Even if transmission errors extend to a plurality of lines in succession of the received picture signals, if the picture signals are deinterleaved, the advantage of sharing is obtained, thereby allowing the transmission errors to be coped with using a simple and reliable method.

Moreover, according to the present invention, a line containing errors of picture signals can be recorded by regarding it as identical with the just succeeding line, thereby allowing transmission errors to be coped with using a simple and reliable method and an inexpensive facsimile device to be obtained because of a half duplex communication system.

What is claimed is:

1. A facsimile communication system characterized in that, on a transmitting side, a writing is divided in blocks, picture signals for one block are stored in a transmitting picture signal memory, said stored picture signals are interleaved in a specific pattern, and then the interleaved signals are transmitted, and, on a receiving side, received picture signals for one block are stored in a received picture signal memory and said picture signals are deinterleaved in the order of of the writing.

2. A communication system as claimed in claim 1, wherein one said picture signal memory comprises, a first memory and a second memory, each memory having at least capacity for one block of lines.

3. A communication system as claimed in claim 1, wherein the specific pattern by which the picture signals for one block are interleaved in a transmitter is so determined that error picture signals are distributed when a plurality of error picture signals in succession are deinterleaved in a receiver.

4. A processing method for facsimile communication errors using a half duplex communication system wherein on a transmitting side, a writing is divided in blocks, read picture signals for one block are stored in a picture signal memory, said stored picture signals are interleaved in a specific pattern, and then the interleaved signals are transmitted, and, on a receiving side, received picture signals for one block are stored in a picture signal memory and said picture signals are deinterleaved in the order of the specific pattern of the writing and when transmission errors are found on the receiving side, a line containing the errors is regarded as identical with one line of the pair of lines including the line immediately preceding the current line and the line immediately succeeding the current line to record the line.

5. A processing method for communication errors as claimed in claim 4, wherein said picture signal memory is composed of a first memory, a second memory and a third memory and picture signals for a block preceding the current block of lines are stored in the first memory, picture signals for the current block of lines are stored in the second memory, and picture signals for a block succeeding the current block of lines are stored in the third memory.

6. A processing method for communication errors using a half duplex communication system wherein on a transmitting side, a writing is divided in blocks, read picture signals for one block are stored in a picture signal memory, the stored picture signals are interleaved in a specific pattern, and then the interleaved signals are transmitted, and, on a receiving side, received picture signals for one block are stored in a picture signal memory and the picture signals are deinterleaved in the order of the specific pattern of the writing and when transmission errors are found on the receiving side, a line containing the errors is regarded as identical with one line of the pair of lines including the line immediately preceding the current line and the line immediately succeeding the current line to record the line;

wherein after the picture signals for one block stored in the first memory or second memory on the receiving side are deinterleaved when occurrence of errors on lines over successive three lines is detected in the CPU, retransmitting signals of the picture signals for one block are sent from the CPU, and when the CPU on the transmitting side detects the retransmitting signals, the picture signals for one block in the first memory or the second memory are retransmitted.

7. A facsimile communication system, comprising:
means for reading a block of picture signals in order;
means for interleaving the picture signals into a pattern;
a first picture signal memory for storing the pattern of picture signals; and
means for transmitting the pattern of picture signals.

8. A facsimile communication system as claimed in claim 7, comprising:
means for receiving the pattern of picture signals;
a second picture signal memory for storing the received pattern of picture signals; and
means for deinterleaving the pattern of picture signals into the order of the block of picture signals.

9. A facsimile communication system according to claim 8, wherein:
the interleaving means rearranges the picture signals so that picture signals which are adjacent each other in the block of picture signals will be spaced apart when rearranged in the pattern of picture signals;
whereby, when an error occurs in transmission of two adjacent picture signals of the pattern, the errors will be spaced apart when deinterleaved in the order of the block of picture signals.

10. A facsimile communication system according to claim 8, comprising:
a detector for identifying an erroneously transmitted picture signal of the interleaved picture signals; and
means for replacing the erroneously transmitted picture signal with a substitute picture signal.

11. A facsimile communication system according to claim 10, wherein:
the second picture signal memory is adapted to store two blocks of picture signals, the substitute picture signal being provided by a signal from the second block of stored picture signals.

12. A method for facsimile communication, comprising the steps of:
reading a block of picture signals in order;
interleaving the block of picture signals into a pattern of picture signals, thereby changing the order of the picture signals; and
transmitting the pattern of picture signals.

13. A method for facsimile communication as claimed in claim 12, comprising the steps of:
receiving the pattern of picture signals, and
deinterleaving the pattern of picture signals into the order of the block of picture signals.

14. The method of claim 13, wherein:
the step of interleaving the block of picture signals includes spacing apart picture signals which are adjacent each other in the block, so that errors in transmission of adjacent interleaved picture signals will result in errors of spaced apart picture signals after deinterleaving.

15. The method of claim 13, comprising the steps of:
detecting an erroneously transmitted picture signal; and
replacing the erroneously transmitted picture signal with a substitute picture signal.

16. The processing method of claim 15, further including the steps of:
storing a second received pattern of picture signals to be used as the substitute picture signal.

* * * * *